Patented May 13, 1947

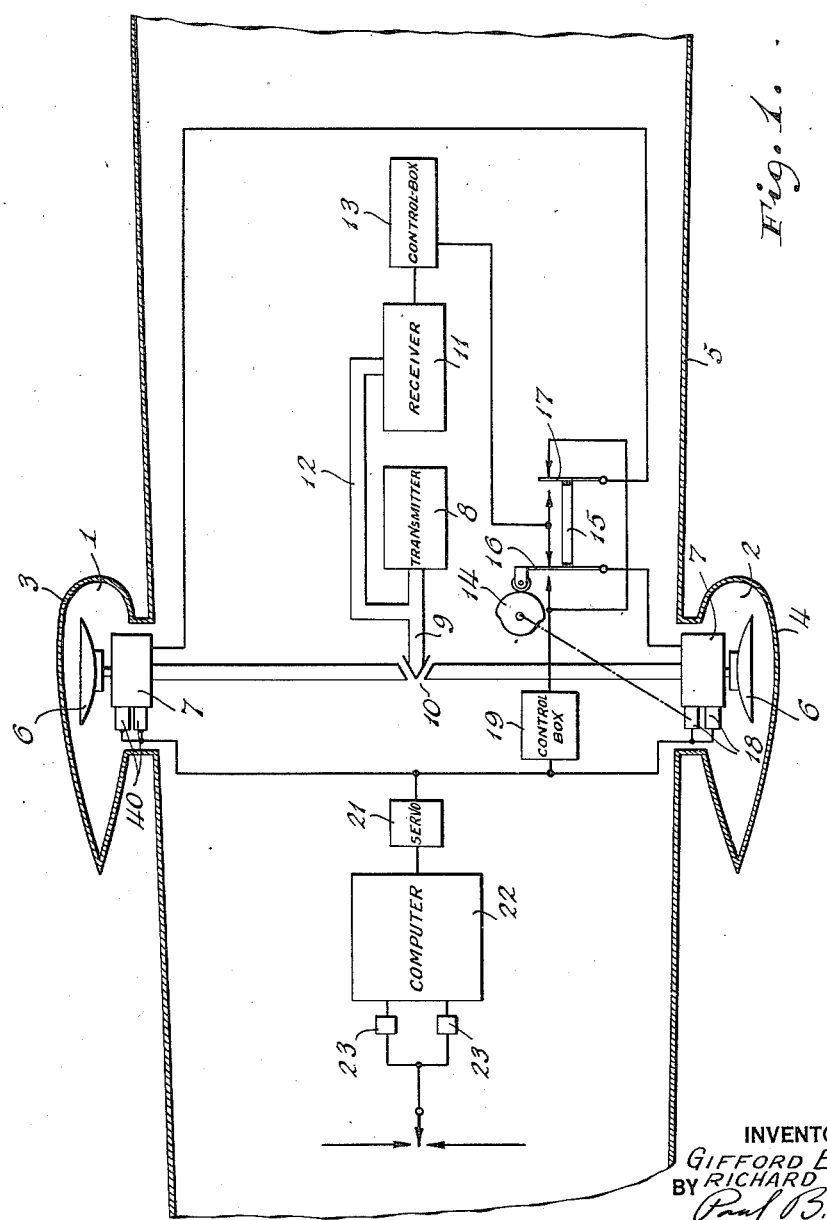

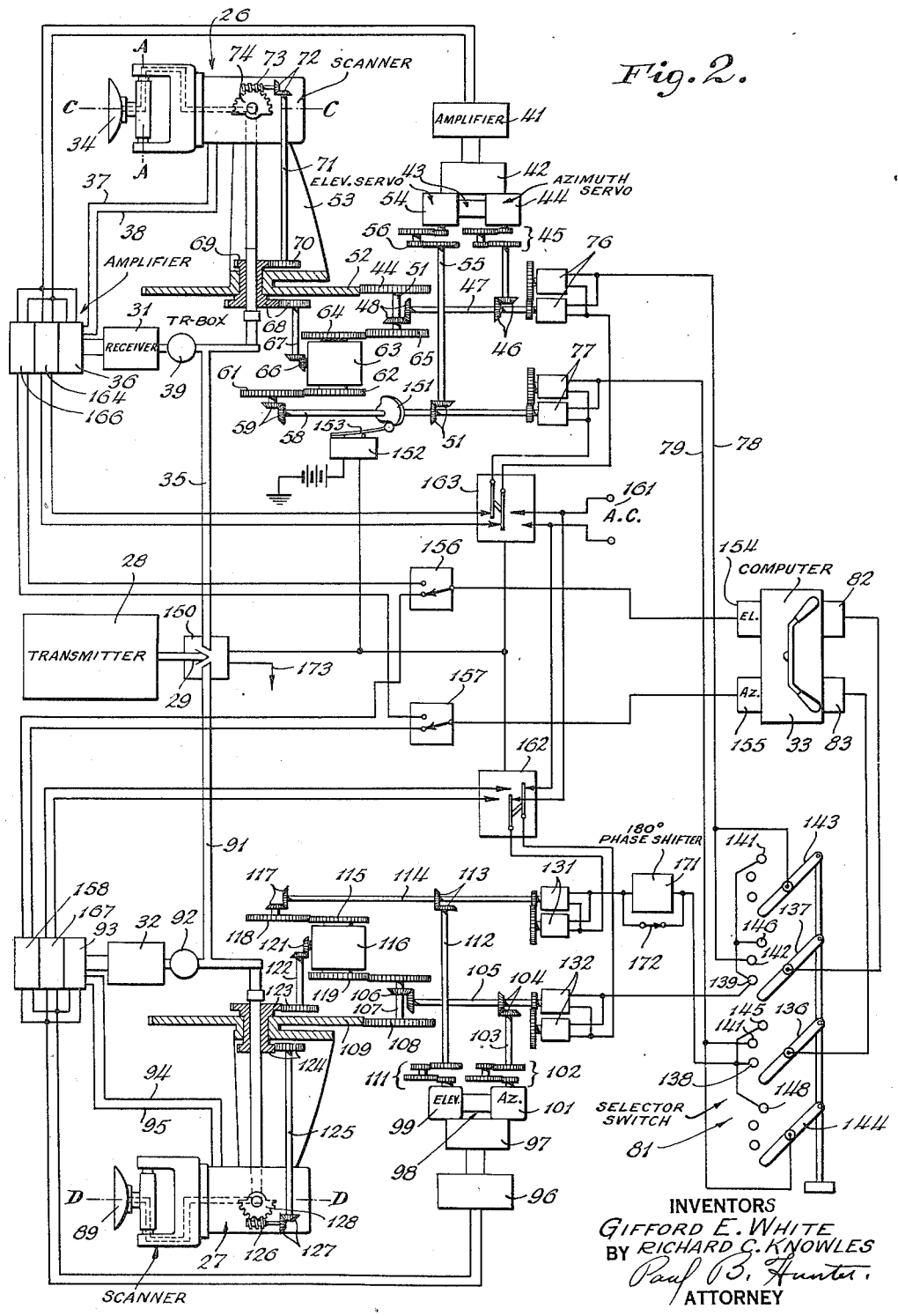

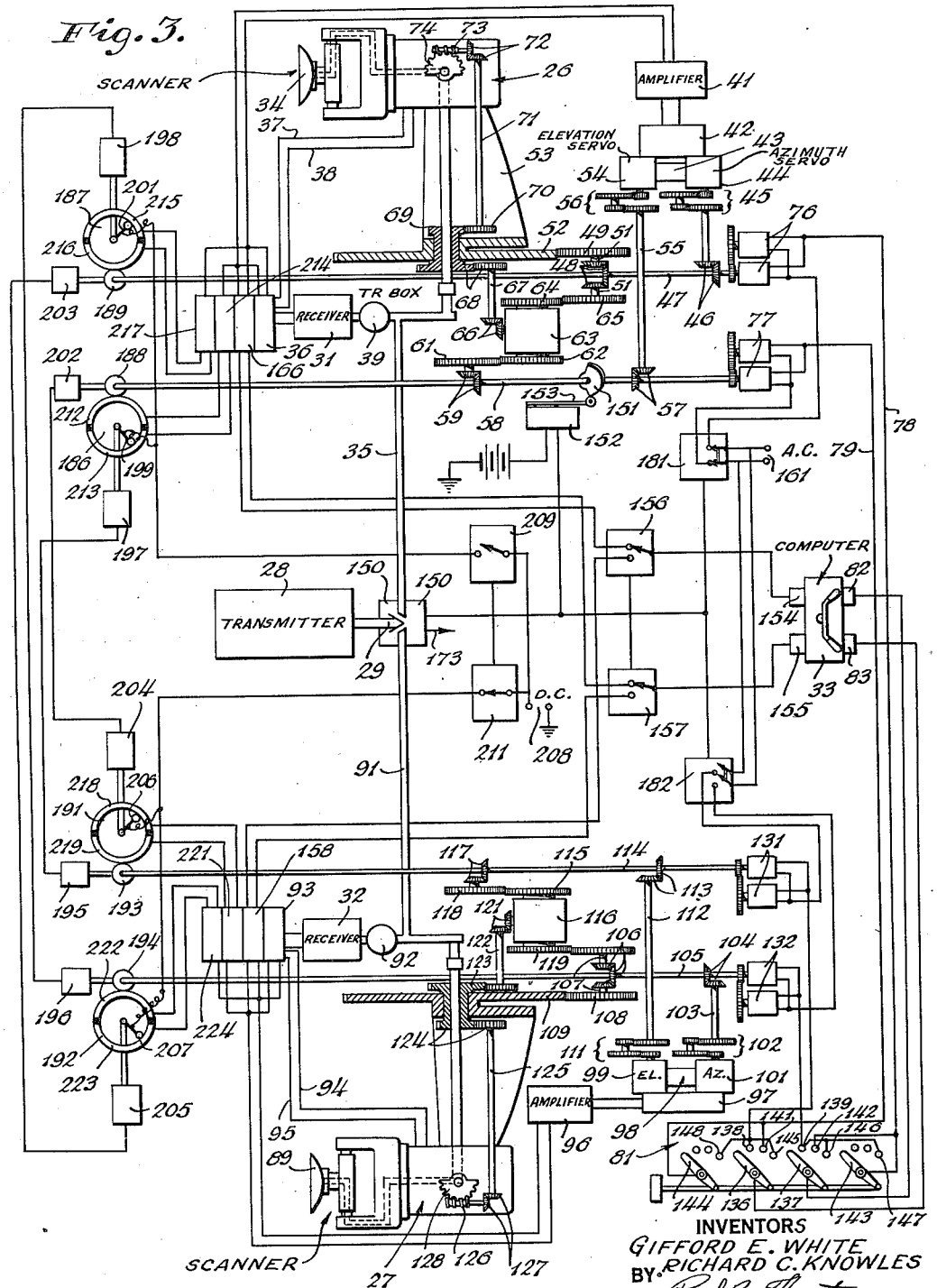

2,420,334

UNITED STATES PATENT OFFICE 2,420,334

AUTOMATIC TRACKING SYSTEM

Gifford E. White, Hempstead, and Richard C. Knowles, New York, N. Y., assignors to Sperry Gyroscope Company, Inc., Brooklyn, N. Y., a corporation of New York Application January 25, 1943, Serial No. 473,560

21 Claims. (Cl. 250—1.54)

1

The present invention concerns radio-directed fire control systems, and is especially adapted for use in aircraft. The invention relates particularly to systems similar to that described in copending application Serial No. 441,188, for Radio gun control system, filed April 30, 1942, in the names of C. G. Holschuh et al.

In fire control systems for aircraft, it is desirable to have guns arranged to be aimed at all angles relative to the craft and also to have sighting instruments and directors capable of operation in any direction relative to the craft. Systems providing such overall coverage may be described as spherical systems for the reason that they are capable of directing operations throughout a sphere having the aircraft at its center and extending any desired distance from the craft.

In scanners that have been used for projecting radiant energy beams for aircraft for fire control purposes, mechanical limitations have been such that the individual scanners were unable to cover more than a hemisphere due to the difficulty in mounting the scanner a sufficient distance from the body of the craft. Previous radio-directed fire control systems have only been capable of aiming guns at targets located within a hemisphere extending from one portion, usually the nose, of the craft.

It is an object of the present invention to provide a radio-directed fire control system capable of directing guns into the entire sphere surrounding the craft.

Another object of the invention is to provide a radio-directed fire control system with scanners arranged to track targets located at any point within the entire sphere surrounding the aircraft.

A further object of the invention is to provide a radio-directed fire control system for tracking targets located at any points within the entire sphere surrounding the aircraft, and automatically training guns on said target.

A further object of the invention is to provide a radio-directed fire control system having a pair of scanners for projecting radiant energy beams into two complementary hemispheres with means controlled by said beams for causing guns on the aircraft to track targets located in said hemispheres, and to automatically shift the control of said guns from one of the scanners to the other as the target moves from one hemisphere to another.

A still further object of the invention is to provide a radio directed fire control system having two scanners for projecting radiant energy

2 beams into two complementary hemispheres with means for causing one scanner to track a target and means to cause the other scanner to be positioned in accordance with the movements of the first scanner.

A still further object of the invention is to provide spherical scanning in a radio directed fire control system by arranging two scanners, each operative to project a radiant energy beam in one of two complementary hemispheres, with means for causing one scanner to follow the target while the other scanner is positioned in accordance with the movements of the first scanner and means for automatically switching from one scanner to the other as the target moves from one hemisphere to the other.

In accomplishing these objects, two systems similar to that disclosed in the above-mentioned copending application, Serial No. 441,188, may be used for scanning two complementary hemispheres whereby one system may be used to track a target and to control the second system. The second system is thereby constantly positioned to begin tracking at any time the target moves from one hemisphere to the other.

Scanners for projecting radiant energy beams into the two hemispheres adjacent the aircraft may be arranged at any two opposite points of the aircraft such as the top and bottom, nose and tail, or on opposite sides. All of these arrangements will give substantially the same results in so far as the fire control system herein described is concerned. However, to simplify the following description it will be assumed that the two scanners are arranged in the top and bottom of the fuselage of an aircraft.

Other objects and advantages of the invention will become apparent from the following description and accompanying drawings, in which Fig. 1 is a diagrammatic view showing the invention with two scanners arranged above and below the fuselage of an aircraft.

Fig. 2 is a schematic diagram showing the relationship and cooperation of the various elements in a system embodying one form of the invention.

Fig. 3 is a schematic diagram showing a system embodying a modified form of the invention.

As shown in Fig. 1 a pair of scanners designated, generally by the reference numerals 1 and 2, are arranged in nacelles 3 and 4 extending above and below the fuselage 5 of an aircraft. Each of the scanners has a parabolic reflector 6 for directing a beam of radiant energy into a portion of space adjacent the aircraft. A suitable mechanism 7 is provided to cause the reflector 6 of each of the scanners to scan the portion of space toward which it is directed. These mechanisms may be of any suitable form, as will hereinafter appear. High frequency radiant energy, usually modulated with a short pulse, is supplied from a transmitter 8 through a wave guide 9 to a microwave switch 10 that is arranged to selectively direct radiant energy to the scanners 1 and 2, respectively.

A receiver 11 is provided for receiving that portion of the energy which may be reflected from a distant object to one of the reflectors 6. Energy reflected to the reflectors in this manner is transmitted through microwave switch 10 and wave guides 9 and 12 to the receiver 11.

The pattern defined by the radiant energy beam projected from the scanners 7 may be similar to that described as "conical scanning" in the above-mentioned copending application Serial No. 441,188 whereby the position of a target relative to the "spin axis" of the scanner is determined by the phase relationship between the reflected signal and reference voltages generated by the scanner. This phase relationship is utilized by control box 13 to produce an output signal corresponding to the displacement of the "spin axis" of the scanner from the target. As described in the above-mentioned copending application Serial No. 441,188, this signal is transmitted to suitable servo mechanisms for correcting the position of the scanner to align its "spin axis" with the target.

In the present invention a cam 14 is rotated in accordance with the position of the scanners in elevation. A switch 15 is moved by said cam to connect the output of control box 13 to the scanner that is tracking the target. Thus, when a target is above the ship, the upper scanner 1 will track, whereas a target below the ship will be tracked by the lower scanner 2. As shown in Fig. 1, the cam 14 is in a position corresponding to that in which the lower scanner 2 is tracking the target and contact 16 of switch 15 connects control box 13 to the scanner 2. Another contact 17 of the switch 15 connects suitable self-synchronous position transmitters 18 through a control box 19 to the upper scanner 1. This connection provides means whereby the scanner 1 will be positioned in accordance with the movements of the scanner 2. Both scanners will at all times be in the same azimuth position so the scanner 1 will be positioned at all times to begin tracking the target should it move from the portion of space covered by scanner 2 to the portion of space covered by scanner 1.

When the target moves from one of the portions of space to the other, cam 14 will move switch 15 to its opposite contacts. This will connect the output of control box 13 to the scanner 1 thus causing this scanner to track the target. The outputs of self-synchronous data transmitters 40 on the scanner 1 are then applied through control box 19 and switch contact 16 to cause the scanner 2 to follow the position of the scanner 1. The data transmitters 18 and 40 are arranged to actuate a suitable servo system 21 that controls a computer 22 in accordance with the position of the scanner that is tracking the target. The computer 22 acts through suitable controls 23 to aim various guns in the aircraft at the predicted position of the target as computed from the information supplied from the servo system 21.

It is not necessary that the guns aimed by the computer operate in the same portions of space or hemispheres as those in which the scanners 1 and 2 project radiant energy. The same guns may be used to fire at targets that move from one of the portions of space to another.

Fig. 2 shows in more detail a system similar to that described in connection with Fig. 1 but in which the various elements for controlling the positions of the respective scanners and for synchronizing the operations of the scanners is more specifically illustrated.

In this system a pair of scanners, designated generally by the reference numerals 26 and 27, are supplied with high frequency radiant energy from a transmitter 28 through a suitable microwave switch 29. Reflected energy that is picked up by the scanner 26 is supplied to a receiver 31 while energy reflected to scanner 27 is supplied to a receiver 32. This reflected energy is utilized to cause the respective scanners to track a target and also actuates suitable controls to position a computer 33. The computer 33 utilizes information supplied from the scanner tracking the target to aim one or more guns at the target. One form of a computer suitable for this purpose is described in copending application Serial No. 411,136 for Inter-aircraft gun sight and computer, filed September 15, 1941, in the names of Carl G. Holschuh and David Fram.

Considering first the equipment for the upper scanner 26, a reflector 34 is provided for motion about a "nod" axis A and a "spin" axis C. This scanner is also arranged for adjustment in elevation and azimuth by mechanisms to be hereinafter described. One form of such a scanner is described in copending application Serial No. 438,388 for "Scanning devices," filed April 10, 1942, in the names of L. A. Maybarduk et al.

It will be apparent, however, that other types of scanners may be used without departing from the present invention. For example, separate antennae systems, and associated reflectors could be employed for transmitting and receiving the radiant energy. When separate antennae are used, either or both of them may be used to scan the portion of space they are intended to cover.

Ultra high frequency energy from transmitter 28, usually modulated by a short pulse, is supplied through micro-wave switch 29 and wave guide 35 to the wave guide of the scanner and then is radiated in a beam directed by the reflector 34.

Reference voltages, corresponding to the "nod" and "spin" movements of the reflector, are generated by the scanner 26 in a manner such as that described in the above-mentioned copending application Serial No. 441,188. These reference voltages are supplied to an amplifier 36 through suitable connectors 37 and 38. The amplifier 36 is also supplied with signals corresponding to the reflected energy that is received by a receiver 31 through a suitable T-R box 39.

The T-R box 39 is adapted to pass relatively weak signals such as those resulting from received reflected energy, but is adapted to block out relatively high intensity signals such as the energy supplied to the scanner by transmitter 28. One form of a T-R box suitable for this purpose is clearly described in copending application Serial No. 406,494 for "Radio apparatus," filed August 12, 1941, in the names of J. Lyman et al.

The output voltage of amplifier 36 varies in accordance with the phase differential between the signal from the receiver 31, corresponding to the received reflected energy, and the reference voltages supplied by connectors 37 and 38. This output is connected through another amplifier 41 and a control box 42 to a suitable servo mechanism designated generally at 43, such as the well known Vickers drive, for positioning the scanner in elevation and azimuth in accordance with the voltages from amplifier 36. The purpose of the control box 42 is to govern the limits of operation and to prevent undesired movements of the scanner.

The output of azimuth servo mechanism 44 operates through suitable reduction gearing 45 and bevel gears 46 to rotate a shaft 47 which in turn acts through bevel gears 48 to rotate a pinion 49 on a shaft 51. The shaft 51 rotates a gear 52 on the support for the scanner 26 to adjust the azimuth position of the scanner 1 in accordance with the output of amplifier 36.

Elevation servo mechanism 54 rotates shaft 55, that acts through reduction gearing 56 to rotate bevel gears 57 which in turn operate through shaft 58 and bevel gears 59 to rotate a pinion 61. The pinion 61 is geared to one input 62 of a compensating differential 63. The other input 64 of the differential is geared to a pinion 65 that is moved in accordance with the azimuth changes of the scanner corresponding to the rotation of the shaft 47. Output 66 of the differential 63 operates through a shaft 67, reduction gears 68 and a pair of meshing spur gears 69 and 70 to rotate a shaft 71. Rotation of shaft 71 is effective through bevel gears 72 and a worm 73 to rotate a worm gear 74 that varies the elevation position of the scanner 26 in accordance with the output of amplifier 36.

As the scanner 26 is rotated in azimuth, the gear 70 on shaft 71 will "walk" around the gear 69 that is held stationary except during adjustments in elevation. This causes the shaft 71 to rotate, thereby causing changes in elevation when only changes in azimuth are desired. Such undesired movement is compensated by connecting the azimuth movement of shaft 47 to one of the inputs 64 of the differential 63. It will thus be seen that movements of the scanner in azimuth will cause the output of differential 66 to move gears 68 and 69 in a manner to hold shaft 71 stationary whereby shaft 71 will only be moved when changes in elevation are desired, and input 62 of the differential is rotated.

The rotation of shafts 47 and 58 correspond to the changes in azimuth and elevation, respectively, of the scanner 26. These shafts are arranged to rotate suitable self-synchronous transmitters 76 and 77 which are arranged to supply data to the computer corresponding to changes in azimuth and elevation, respectively. The signals generated by these transmitters are connected through suitable connectors 78 and 79 to a selector switch 81 to servo mechanisms 82 and 83 for positioning the computer 33. These self synchronous transmitters 76 and 77 may be of a desired type such as "Selsyn," "Autosyn," or "Telegon" transmitters.

The computer 33 is arranged to aim one or more guns at the particular position of a target in response to the input data derived from the movements of the scanner 26. A computer suitable for this purpose is described in copending application Serial No. 411,186 for "Inter-aircraft gun sight and computer," filed December 17, 1941, in the names of C. G. Holschuh et al.

As may be seen from the foregoing description, the system thus far described is similar in operation to that described in the above-mentioned copending application Serial No. 441,188. The present invention includes a similar system for controlling computer 33 in accordance with the movements of the lower scanner 27 as it adjusts its reflector 89 to track a target.

This second system includes a wave guide 91 for supplying high frequency energy from transmitter 28 through microwave switch 29 to the scanner 27. Reflected energy received by the scanner is fed through a T-R box 92 to receiver 32 and then to an amplifier 93 corresponding to the previously described amplifier 36.

Reference voltages generated by the scanner 27, similar to those from the scanner 26, are supplied through connectors 94 and 95 to the amplifier 93, the output of which corresponds to the displacement of "spin axis" D—D of the scanner 27 from the target. This output is supplied to a suitable amplifier 96 which actuates a control box 97 that controls a suitable servo mechanism 98 having elevation and azimuth outputs 99 and 101, respectively. The rotation of the outputs 99 and 101 corresponds to the voltages supplied by amplifier 93.

The azimuth output 101 is connected through suitable reduction gearing 102, a shaft 103, and bevel gears 104, to rotate a shaft 105 in accordance with the azimuth displacement required to move the spin axis of the scanner 27 on to the target. The shaft 105 drives bevel gears 106 to rotate a shaft 107 which acts through pinion 108 to position gear 109 on the support of the scanner 27 in the desired azimuth position.

The elevation output 99 of the servo mechanism operates through suitable reduction gearing 111, shaft 112 and bevel gears 113 to position a shaft 114 in accordance with the change in elevation desired. Shaft 114 rotates one input 115 of a compensating differential 116 through bevel gear 117 and a spur gear 118. The other input 119 of the differential 116 is rotated in accordance with the changes in the azimuth position of the scanner for the same reason as that described above in connection with the scanner 26. The output 121 of differential 116 is supplied through a shaft 122, gears 123 and 124 to rotate a shaft 125 which in turn rotates worm 126 through bevel gears 127 to position worm gear 128 in accordance with the elevation of the scanner 27 required.

The elevation and azimuth positions of the scanner 27 are transmitted to the computer 33 by suitable self-synchronous transmitters 131 and 132, respectively. These transmitters supply signals through selector switch 81 to the servo control mechanisms 82 and 83 of the computer 33 in a manner similar to that described above in connection with transmitters 76 and 77. The self-synchronous transmitters 131 and 132 may be of any desired type such as "Selsyn," "Autosyn," or "Telegon" transmitters.

The two radio gun control systems thus far described may be used individually to control computer 33 by adjusting the selector switch 81. When arms 136 and 137 are on contacts 138 and 139, the outputs of the self-synchronous transmitters 131 and 132 will be supplied to the computer 33; the outputs of self-synchronous transmitters 76 and 77 or the upper scanner 26 will be disconnected from the computer. By moving the arms 136 and 137 to contacts 141 and 142, respectively, transmitters 131 and 132 will be disconnected and transmitters 76 and 77 connected to the computer.

When the arms 136 and 137 and arms 143 and 144 are moved to contacts 145, 146, 147, and 148, respectively, the outputs of the transmitters 76 and 132 will both be connected to azimuth servo mechanism 82 of the computer 33. Likewise the outputs of transmitters 77 and 131 will both be connected to elevation servo mechanism 83 of the computer 33. With the selector switch in the last-named position, the two scanning systems will be arranged for automatic operation and will be synchronously controlled to automatically follow the same target from the portion of space covered by one scanner to the portion of space covered by the other scanner.

Assuming scanners 26 and 27 are both adapted to direct radiant energy beams into a portion of space equivalent to a hemisphere, it will be seen that the two hemispheres will have substantially the same base since the scanners are mounted at diametrically opposed points on the fuselage of the aircraft. It has been found desirable to have each of the scanners cover slightly more than a hemisphere whereby an overlap of a small amount, such as three or four degrees, between the portions of space covered by the respective scanners is provided.

With this small overlap, both scanners will be capable of tracking the target for the comparatively short interval during which it passes from one hemisphere to the other. As a result of the operation of synchronizing mechanisms, to be hereinafter explained, the two scanners will be arranged in identical azimuth and elevation positions during this short interval.

The apparatus for selectively operating the two systems and for synchronizing them includes a cam 151 that is mounted on the shaft 58 which is rotated in accordance with the changes in elevation of the scanner 26. This cam is divided into two 180° portions, one of which has a cam surface higher than the other. A switch 152 is actuated by a cam follower 153 that is moved by cam 151 to close the switch during 180° of rotation in which the higher cam surface engages the follower.

When the follower passes to the lower cam surface of the cam 151, the switch 152 is open. The cam 151 is arranged on the shaft 58 so the follower 153 will move from the higher to the lower surface at the same instant that the scanner 26 moves through zero elevation. This switch, when closed, supplies energy to a plurality of relays, each of which operates a double throw switch. These latter switches are alternatively closed in one position or another depending upon whether or not the relay is energized. The function of the individual relay switches will be more fully described in connection with other portions of the apparatus.

As is explained in the above mentioned copending application Serial No. 441,188, it is desirable to first manually control the position of the scanners before beginning automatic tracking in order that the operator may select a particular target to be tracked. This manual tracking is also desirable in the present system, whether the scanners are being operated individually or are synchronized. When the system is set for synchronous operation as by placing the contact arms of the switch 81 in the last position to connect both scanner systems with the computer, the computer is operated manually and the scanners follow the computer until one of the scanners is directed toward the target.

Assuming for purposes of the following description that the selected target is in the lower hemisphere, cam 151 will be in a position shown in the drawing causing the switch 152 to be open. When the switch 152 is open, relay 150 for the microwave switch 20 is adjusted so the switch is directing energy from transmitter 28 to the lower scanner 27. The movements of the computer 33 in response to manual control of the operator are supplied through suitable self-synchronous elevation and azimuth position transmitters 154 and 155 to relays 156 and 157, respectively.

The switches controlled by relays 156 and 157 connected, as shown in Fig. 2, to direct signals from transmitters 154 and 155 to an amplifier 158, the output of which is varied in accordance with the signals supplied from the computer. This output is fed to another amplifier 96 which controls servo mechanism 98 to position the scanner 27 in accordance with the manual operation of the computer 33. In this manner the computer may be adjusted until the scanner 27 is substantially on the desired target. When this is accomplished the system may be set for automatic tracking operations in a manner such as that described in the above-mentioned copending application Serial No. 441,188. The scanner 27 will then begin tracking the target in accordance with the received signals which are supplied to receiver 32 and are fed through amplifiers 93 and 96 to control the servo mechanism 98.

Transmitters 131 and 132 are energized with alternating current from a suitable source 161 through relay switch 162 which is set in the position shown in the drawing. The transmitters 131 and 132 therefore control the position of the computer 33 through servo mechanisms 82 and 83.

As may be seen from the drawings, the output of transmitter 131 is connected to the transmitter 77 through switch contact 148, switch arm 144, and connector 79. Transmitter 132 is similarly connected to the transmitter 76 through switch contact 147, switch arm 143, and connector 78. When the switch 152 is open, relay switch 163 disconnects transmitters 76 and 77 from the alternating current source. When the switch 152 is in open position as shown in the drawing, the signals of transmitters 131 and 132 corresponding to the elevation and azimuth positions of the scanner 27 are supplied to transmitters 77 and 76, respectively. The positions of the transmitters 77 and 76 are adjusted in accordance with the elevation and azimuth movements of the scanner 26. Therefore the outputs of transmitters 76 and 77 are dependent upon the position of the scanner 26 as well as the voltages from transmitters 131 and 132. These outputs are supplied through a relay 163 to a suitable amplifier 164 which converts them into signals adapted to be supplied to amplifier 41 to control servo mechanism 43 for positioning the scanner 26.

The signals supplied from transmitters 76 and 77 to the amplifier 164 will cause servo mechanism 43 to adjust the scanner 26 until the transmitters reach synchronous position, at which time the azimuth positions of the scanners 26 and 27 will be identical. The elevation positions will, of course, be different since the movements of the scanner 26 are limited substantially to a single hemisphere. Hence the elevation of the scanner 26 will be approximately zero but it will follow the changes in the azimuth position of the scanner 27 and thus be ready at all times to begin tracking the target should it move from the lower to the upper hemisphere.

When the target approaches zero elevation with respect to the two scanners, they will both begin tracking and they will move synchronously in elevation as well as in azimuth. As the target passes through zero elevation the scanner 26 will assume control and begin tracking the target alone, due to the fact that cam 151 will close switch 152 and thus reverse the position of the relays 150, 156, 157, 162 and 163 from the positions that are shown in the drawings.

This change in the positions of the relays will cause microwave switch 29 to feed energy through the transmitter to the upper scanner 26. Should it now be desired to utilize manual tracking, the data from the computer 33 will be supplied through relays 156 and 157 to an amplifier 166 that is similar to the amplifier 158. The amplifier 166 is arranged to supply signals for controlling servo mechanism 43 in accordance with the position of computer 33.

Relay 162 will disconnect transmitters 131 and 132 from the alternating current source 161 and connect these transmitters to a suitable amplifier 167, similar to amplifier 164. Transmitters 76 and 77 may be connected by the relay 163 to the source 161 of alternating current. These transmitters will now be energized and will supply data, corresponding to the azimuth and elevation positions of the scanner 26, to the computer 33 through selector switch 81.

The outputs of transmitters 76 and 77 will also be supplied from selector switch 81 to transmitters 132 and 131, respectively, for controlling the azimuth and elevation positions of the scanner 27. The outputs of transmitters 131 and 132 will depend upon the position of the scanner 27 as well as the voltages from transmitters 76 and 77. When the outputs of the transmitters 131 and 132 are connected to the amplifier 167, servo mechanism 98 is actuated to adjust the scanner 27 until the transmitters 131 and 132 reach positions that are synchronous with transmitters 76 and 77.

By this apparatus, the upper scanner 26 will track the target either manually or automatically, and the scanner 27 will be positioned to begin tracking the target in a manner similar to that previously described.

The fire control system described is primarily intended for tracking operation, either manual or automatic. If desired, the system may also be used for searching operations. The most advantageous arrangement for searching would be to have the "spin axes" of the two scanners directed in opposite directions. This may be accomplished by inserting a 180° phase shifting device 171 in the connections between transmitters 131 and 77, as by opening a shorting switch 172.

Such a phase shifter will enable the two scanners to be positioned 180° apart in elevation. Assuming the scanners to both have zero elevation at the time the phase shifter is inserted, the normal synchronous operation of the system will cause the scanners to be positioned in the same azimuth position. Thus, if the lower scanner is moved to a position so its spin axis is perpendicular to the ship, the upper scanner will be moved in the opposite direction until its spin axis is also perpendicular to the ship.

When the two scanners are arranged in this manner, their "spin axes" will lie in diametrically opposite positions. By using "spiral" scanning with the two scanners, it is possible to obtain spherical scanning as described in copending application Serial No. 471,780 for Fire control systems, filed January 8, 1943, in the name of G. E. White. The microwave switch 29 would be controlled through a connector 173, leading from the control panel, to supply radiant energy to both scanners. Energy reflected to the scanners would be supplied to their respective receivers 31 and 32. The receivers then might be utilized to control a pair of cathode ray tubes (not shown) to indicate the relative positions of all targets within the sphere surrounding the ship.

This searching operation ordinarily precedes the tracking operations previously described to present to the fire control officer information that will enable him to select the target or targets on which the guns will concentrate their fire. It is obvious that a separate system, such as that described in the aforementioned copending application Serial No. 471,780, may be used in conjunction with the present system to provide searching operations at the same time that the present system is tracking.

The system illustrated in Fig. 3 is quite similar to that previously described in connection with Fig. 2, except that somewhat different arrangements are provided for synchronizing the positions of the two scanners. In order to avoid unnecessary description of this figure, identical reference designations have been given to those elements shown in Fig. 3 which have corresponding elements in Fig. 2.

It will be apparent that the two scanners 26 and 27 of Fig. 3 and their related equipment are the same as those shown in Fig. 2. These scanners are supplied with high frequency energy by a transmitter 28 through microwave switch 29, and energy reflected to the scanners is detected by receivers 31 and 32, respectively. Servo mechanisms 43 and 98 are actuated by amplifiers 36 and 93 to cause the respective scanners to track a target in response to signals from receivers 31 and 32. A computer 33 is supplied with data corresponding to the positions of the respective scanners by means of transmitters 76 and 77 for the scanner 26 and transmitters 131 and 132 for the scanner 27. These signals are supplied through a selector switch 81, whereby either one or both of these scanners' signals may be supplied to the computer.

The respective scanners may be controlled manually from the computer signals from transmitters 154 and 155 through relay switches 156 and 157, which selectively supply the computer signals to amplifiers 166 and 158. It will be apparent that the operation of this portion of the system is substantially the same as that described in connection with Fig. 2.

Transmitters 76 and 77 are energized from a suitable source 161 of alternating current through a relay switch 181 that is closed when the upper scanner 26 is tracking the target. This relay switch is similar to the switch 163, but it does not supply the signals from transmitters 76 and 77 to position the upper scanner when the lower scanner 27 is tracking the target, as is the case in the system shown in Fig. 2.

When the lower scanner 27 is tracking the target, the transmitters 131 and 132 are energized from the source 161 by a relay switch 182 that is then closed. At this time relay switch 181 is opened. It will be seen that the transmitters 76 and 77 will supply signals to the computer when the upper scanner is tracking, while transmitters 131 and 132 will supply signals to the computer when the lower scanner is tracking.

In the following description of the mechanism for synchronizing the positions of the two scanners, it will be assumed that the upper scanner is tracking, whereby the cam 151 will cause switch 152 to be closed, as shown in the drawing. The positions of the relay switches will also be as shown in the drawings.

The mechanism for synchronizing the positions of the two scanners comprises a pair of split synchronizing rings, the segments of which are insulated from each other. These rings are rotated in accordance with the azimuth and elevation positions of the respective scanners. Each of the rings is provided with a trolley contact that is positioned in accordance with the azimuth and elevation position of the opposite scanner.

Upper scanner 26 has a pair of synchronizing rings 186 and 187 for elevation and azimuth, respectively. The ring 186 is rotated by a pinion 188 on shaft 58 in accordance with the elevation position of the scanner, and ring 187 is rotated by a pinion 189 on shaft 47 in accordance with the azimuth position of the scanner. Similar rings 191 and 192 for the lower scanner are positioned in elevation and azimuth, respectively, by pinions 193 and 194 on shafts 114 and 105.

The shafts 114 and 105 also rotate the rotors of self-synchronous transmitters 195 and 196. These transmitters may be of any suitable type, such as self-synchronous transmitters known as "Selsyns," "Telegons," or "Autosyns." The outputs of these transmitters are connected to corresponding self-synchronous receivers 197 and 198 that position trolley contacts 199 and 201 on the elevation and azimuth synchronizing rings 186 and 187 for the scanner 26. Similarly, self-synchronous transmitters 202 and 203 on the shafts 58 and 47 are connected to self-synchronous receivers 204 and 205 that position trolley contacts 206 and 207 on the elevation and azimuth synchronizing rings 191, 192 for the lower scanner 27.

Each of the trolley contacts 199, 201, 206 and 207 may be connected to a suitable source of direct current 208. The contacts 199 and 201 for the upper scanner 26 are connected to the source 208 through a relay switch 209 that is open, as shown in the drawing, when the upper scanner is tracking. The contacts 206 and 207 for the lower scanner 27 are connected to the source 208 through a relay switch 211 that is closed when the upper scanner is tracking.

Each of the segments 212 and 213 of the ring 186 is connected to the input of a suitable amplifier 214, the output of which is supplied to amplifier 41 to position the scanner 26 in elevation and azimuth through the operation of servo mechanism 43. Similarly, segments 215 and 216 of the ring 187 are connected to the input of an amplifier 217, the output of which acts to position the scanner 26. Segments 218 and 219 of the ring 191 are connected to the input of an amplifier 221, the output of which is supplied to amplifier 96. The amplifier 96 thus controls servo mechanism 98 to position the lower scanner 27 corresponding to the elevation and azimuth positions of the upper scanner. In like manner, segments 222 and 223 of split ring 192 are connected to an amplifier 224 which acts through servo mechanism 98 to position the scanner 27.

When the upper scanner is tracking, a voltage will be supplied from source 208 through relay switch 211 to the trolley contacts 206 and 207. These contacts are positioned on the synchronizing rings 191 and 192 for the lower scanner in accordance with the elevation and azimuth positions of the upper scanner. The rings 191 and 192 are positioned in accordance with the elevation and azimuth positions of the lower scanner 27.

It will be apparent that when the two scanners are in different elevation and/or azimuth positions, the voltage from source 208 will be supplied through one of the segments of the synchronizing rings to amplifiers 221 and/or 224. The outputs of these amplifiers will be supplied to amplifier 96 which will then actuate servo mechanism 98 to adjust the position of the scanner until the synchronizing rings 191 and 192 are rotated sufficiently to position the insulated portions thereof opposite the trolley contacts 206 and 207.

In a similar manner, when the lower scanner is tracking, relay switch 209 will be closed, and relay switch 211 will be open, whereby voltage from source 208 will be supplied to trolley contacts 199 and 201, which are positioned in accordance with the elevation and azimuth positions of the lower scanner 27. When the scanners 26 and 27 are in dissimilar positions, voltages will be supplied to amplifiers 214 and/or 217 which will actuate amplifier 41, thereby causing servo mechanism 43 to adjust the position of scanner 26 until rings 186 and 187 are rotated an amount sufficient to position their insulated portions opposite the trolley contacts. When this position is reached, the scanner 26 will be synchronized with the scanner 27.

As has been previously explained, when one scanner is tracking, the other scanner follows it only in azimuth since mechanical limits prevent the scanners from operating through 360° in elevation. Each of the scanners 26 and 27 is adapted to project a radiant energy beam into any portion of a hemisphere. In addition, these scanners may overlap a small amount, such as 3° or 4°, in order to insure tracking the target at all times.

Assuming scanner 26 is tracking the target, the switch 152 and the various relay switches will be positioned as shown in the drawing. As the target approaches zero elevation, the scanner 27 will begin tracking in synchronism with scanner 26, but under the control of scanner 26, by means of the synchronizing mechanism heretofore explained. As the target actually passes through zero elevation, the scanner 27 will assume control, and the scanner 26 will track the target synchronously therewith through the amount of its overlap into the hemisphere covered by scanner 27.

As has been previously pointed out, the systems illustrated and described in detail herein are for complementary hemispheres above and below an aircraft. However, each of these systems may be adapted to scan complementary hemispheres arranged on opposite sides, fore and aft, or at any other two diametrically opposed points on the aircraft.

By providing scanning for two complementary hemispheres, complete coverage of the sphere surrounding the aircraft is accomplished. Thus, the two scanning devices are arranged to alternatively track the target in response to radiant energy reflected therefrom and to follow the position of the tracking scanner, thereby being positioned at all times to begin tracking the target should it move from one hemisphere to the other.

Although the systems described herein utilize scanners covering entire hemispheres, it is contemplated that the scanners could be adjusted

What is claimed is:

1. An automatic tracking system, comprising means for projecting radiant energy into space, a pair of positionable devices having directional characteristics for collecting energy reflected from objects located in separate portions of said space, means responsive to said reflected energy for causing one of said devices to track an object, and means actuated by said one device for positioning the other of said devices to begin tracking said object when it moves between said portions of space.

2. An automatic tracking system, comprising means for projecting radiant energy into space, a pair of positionable devices having directional characteristics for collecting energy reflected from objects located in separate portions of said space, a control mechanism responsive to said reflected energy for selectively causing one of said devices to track an object in a first of said portions of space, and a second control mechanism responsive to the position of the tracking device for positioning the other of said devices to begin tracking when said object moves into a second of said portions of space.

3. An automatic tracking system, comprising means for projecting radiant energy into space, a pair of positionable devices having directional characteristics for collecting energy reflected from objects located in separate portions of said space, a control mechanism responsive to the said reflected energy for selectively causing one of said devices to track an object in a first of said portions of space, a second control mechanism responsive to the position of the tracking device for positioning the other of said devices to begin tracking when said object moves into a second of said portions of space, and means responsive to the respective positioning of said devices for connecting said control mechanisms to said devices in accordance with the portion of said space in which the object being tracked is located.

4. An automatic tracking system, comprising means for projecting radiant energy into space, a pair of positionable devices having directional characteristics for collecting energy reflected from objects located in separate portions of said space, manually operated means for positioning one of said devices to track an object located in a first of said portions of space, a control mechanism responsive to reflected energy for causing said one device to track said object, and a second control mechanism responsive to the position of the tracking device for positioning the other of said devices to begin tracking when said object moves into a second of said portions of space.

5. An automatic tracking system, comprising means for projecting radiant energy into space, a pair of positionable devices having directional characteristics for collecting energy reflected from objects located in separate portions of said space, manually operated means for positioning one of said devices to track an object located in a first of said portions of space, a control mechanism responsive to said reflected energy for causing said one device to track said object, a second control mechanism responsive to the position of the tracking device for positioning the other of said devices to begin tracking when said object moves into a second of said portions of space, and means responsive to the respective positioning of said devices for connecting said control mechanisms to said devices in accordance with the portion of said space in which the object being tracked is located.

6. An automatic tracking system, comprising a pair of directional electro-magnetic transducers positionable to move their respective directivity axes over separate predetermined portions of space, means for receiving energy radiated from an object, a control mechanism responsive to the reception of said radiated energy for causing one of said transducers to track an object in a first of said portions of space, and a second control mechanism responsive to the position of the tracking transducer for positioning the other of said transducers to begin tracking when the object moves into a second of said portions of space.

7. An automatic tracking system, comprising a pair of directional electro-magnetic transducers positionable to move their respective directivity axes over separate predetermined portions of space, means for receiving energy radiated from an object, a control mechanism responsive to the reception of said energy for causing one of said transducers to track an object in a first of said portions of space, a second control mechanism responsive to the position of the tracking transducer for positioning the other of said transducers to begin tracking when the object moves into a second of said portions of space, and means responsive to the respective positioning of said transducers for connecting said control mechanisms to said transducers in accordance with the portion of space in which the object being tracked is located.

8. An automatic tracking system, comprising a pair of directional electro-magnetic transducers positionable to move their respective directivity axes over separate portions of space, means for receiving that portion of energy reflected from an object, manually operated means for positioning one of said transducers to track an object located in a first of said portions of space, a control mechanism responsive to the reception of said reflected energy for positioning said one transducer to track said object in a first of said portions of space, and a second control mechanism responsive to the position of the tracking transducer for positioning the other of said transducers to begin tracking when the object moves into the second of said portions of space.

9. An automatic tracking system, comprising a pair of directional electro-magnetic transducers positionable to move their respective directivity axes over separate portions of space, means for receiving that portion of energy reflected from an object, manually operated means for positioning one of said transducers to track an object located in a first of said portions of space, a control mechanism responsive to the reception of said reflected energy for causing said one transducer to track said object in a first of said portions of space, a second control mechanism responsive to the position of the tracking transducer for positioning the other of said transducers to begin tracking when the object moves into the second of said portions of space, and means responsive to the respective positioning of said transducers for connecting said control mechanisms to said transducers in accordance with the portion of said space in which the object being tracked is located.

10. A fire control system, comprising means for projecting radiant energy into space, a first positionable device having a directional characteristic for collecting energy reflected from an object in one portion of said space, a second positionable device having a directional characteristic for collecting energy reflected from an object in a second portion of said space, a control mechanism responsive to said reflected energy for selectively positioning one of said devices to track an object in its respective portion of space, a second control mechanism responsive to the position of the tracking device for positioning the other of said devices to begin tracking when said object moves between said portions of space, and means actuated by movements of the tracking device for supplying target position data to apparatus for positioning guns.

11. A fire control system, comprising means for projecting radiant energy into space, a pair of positionable devices having directional characteristics for collecting energy reflected from objects located in separate portions of said space, manually operated means for positioning one of said devices to track an object located in a first of said portions of space, a control mechanism responsive to said reflected energy for positioning said one device to track said object, a second control mechanism responsive to the position of the tracking device for positioning the other of said devices to begin tracking when said object moves into a second portion of said space, and means actuated by movements of the tracking device for supplying target position data to apparatus for positioning guns.

12. A fire control system, comprising means for projecting radiant energy into space, a pair of positionable devices having directional characteristics for collecting energy reflected from objects located in separate portions of said space, a control mechanism responsive to said reflected energy for causing said one device to track said object, a second control mechanism responsive to the position of the tracking device for positioning the other of said devices to begin tracking when said object moves into a second portion of said space, means actuated by movements of the tracking device for supplying target position data to apparatus for positioning guns, and means responsive to the respective positioning of said devices for selectively connecting said control mechanisms to said devices in accordance with the portion of said space in which the object being tracked is located.

13. A fire control system, comprising means for projecting radiant energy into space, a pair of positionable devices having directional characteristics for collecting energy reflected from objects located in separate portions of said space, manually operated means for positioning one of said devices to track an object located in a first of said portions of space, a control mechanism responsive to said reflected energy for causing said one device to track said object, a second control mechanism responsive to the position of the tracking device for positioning the other of said devices to begin tracking when said object moves into a second portion of said space, means actuated by movements of the tracking device for supplying target position data to apparatus for positioning guns, and means responsive to the respective positioning of said devices for selectively connecting said control mechanisms to said devices in accordance with the portion of said space in which the object being tracked is located.

14. An automatic tracking system, comprising means for projecting radiant energy into space, a pair of positionable scanners having directional characteristics for collecting that portion of said energy reflected from objects located in separate portions of said space, a mechanism for each of said scanners adapted to control the direction of said scanners relative to their respective portions of space, means responsive to the reception of said reflected energy for controlling one of said mechanisms to cause its corresponding scanner to track an object, and means responsive to the position of said tracking scanner for controlling the other of said mechanisms to position its corresponding scanner to begin tracking when said object moves between said portions of space.

15. An automatic tracking system, comprising means for projecting radiant energy into space, a pair of positionable scanners having directional characteristics for collecting that portion of said reflected energy from objects located in separate portions of said space, a mechanism for positioning a first of said scanners to adjust the direction thereof relative to a first portion of said space, a mechanism for positioning the other of said scanners to adjust the direction thereof relative to a second portion of said space, means responsive to the reception of energy reflected from an object in one of said portions of space for controlling one of said mechanisms, means responsive to the position of said tracking scanner for controlling the other of said mechanisms to position its corresponding scanner to begin tracking when said object moves between said portions of space, and a device responsive to the respective positioning of said scanners for selectively connecting said two last-mentioned means to said mechanisms in accordance with the portion of space in which said object is located.

16. An automatic tracking system, a comprising means for projecting radiant energy into space, a pair of positionable scanners having direction characteristics for collecting that portion of said energy reflected from objects located in separate portions of said space, a mechanism for positioning a first of said scanners to adjust the direction thereof relative to a first of said portions of space, a mechanism for positioning the other of said scanners to adjust the direction thereof relative to a second portion of said space, means responsive to the reception of energy reflected from an object in one of said separate portions of space for controlling one of said mechanisms to position one of said scanners to track said object, means responsive to the position of said one scanner for controlling the other of said mechanisms to position its corresponding scanner to begin tracking when said object moves between said portions of space, a device for selectively connecting said two last-mentioned means to said mechanisms, and means responsive to movements of said scanners for actuating said device to reverse the connections of said last-mentioned means to said mechanisms when said object being tracked moves between said portions of space.

17. A fire control system, comprising a pair of positionable scanners adapted to be directed toward separate portions of space, means for supplying radiant energy to each of said scanners for projection into said portions of space, means for receiving energy reflected to said scanners, a mechanism for positioning a first of said scanners to adjust the direction thereof relative to a first of said portions of space, a mechanism for positioning the other of said scanners to adjust the direction thereof relative to a second of said portions of space, means responsive to the reception of energy reflected to one of said scanners from an object located in one of said separate portions of space for controlling one of said mechanisms to position said one scanner to track an object, means responsive to the position of said one scanner for controlling the other of said mechanisms to position its corresponding scanner to begin tracking when said object moves between said portions of space, a device for selectively connecting said two last-mentioned means to said mechanisms in accordance with the portion of space in which said object is located, and means responsive to the position of said mechanisms for supplying target position data to apparatus for positioning guns.

18. An automatic tracking system comprising a pair of directional devices for collecting energy radiated from objects located in separate portions of space, means responsive to said collected energy for causing one of said directional devices to track an object in one of said portions of space, and means actuated according to movement of said one device for positioning the other device to begin tracking said object when it moves into the other portion of space.

19. In an automatic tracking system, the combination of a pair of electromagnetic transducers having directivity axes movable over separate portions of space, control means responsive to energy received from an object in a first of said portions of space for moving the directivity axis of one of said directional transducers to track said object, and means responsive to the movement of said one transducer for positioning the other of said transducers to begin tracking said object when it moves into a second of said portions of space.

20. An automatic tracking system comprising a pair of directional electromagnetic transducers positionable to move their respective directivity axes over adjacent portions of space having an overlapping zone over which the directivity axes of both of said transducers are movable, means responsive to energy received from an object for moving the directivity axis of one of said transducers to track said object in one of said portions of space, and means responsive to the movement of the directivity axis of said transducer for positioning the directivity axis of the other of said transducers to begin tracking said object when it moves into said overlapping zone, said last-named means being constructed and arranged to effect synchronous movement of said directivity axes within said overlapping zone.

21. An automatic tracking system, comprising a pair of directional electromagnetic transducers positionable to move their respective directivity axes over separate predetermined portions of space, means for receiving energy radiated from an object, means responsive to the reception of said energy for causing one of said transducers to track said object, and means responsive to the position of said tracking transducer for positioning the other of said devices to begin tracking said object when it moves between said portions of space.

GIFFORD E. WHITE.
RICHARD C. KNOWLES.

REFERENCES CITED

The following references are of record in the file of this patent:

UNITED STATES PATENTS

| Number | Name | Date |
| --- | --- | --- |
| 1,467,154 | Hammond | Sept. 4, 1923 |
| 2,176,469 | Moueix | Oct. 17, 1939 |